United States Patent
Johnson et al.

(10) Patent No.: US 9,704,115 B2
(45) Date of Patent: Jul. 11, 2017

(54) AUTOMATING WORKFLOW PARTICIPATION

(75) Inventors: Todd E. Johnson, Chatfield, MN (US); John E. Petri, St. Charles, MN (US)

(73) Assignee: International Business Machines Corporation, Armonk, NY (US)

(*) Notice: Subject to any disclaimer, the term of this patent is extended or adjusted under 35 U.S.C. 154(b) by 1864 days.

(21) Appl. No.: 12/793,323

(22) Filed: Jun. 3, 2010

(65) Prior Publication Data
US 2011/0301996 A1    Dec. 8, 2011

(51) Int. Cl.
*G06Q 10/00* (2012.01)
*G06Q 10/06* (2012.01)

(52) U.S. Cl.
CPC ....... *G06Q 10/06311* (2013.01); *G06Q 10/06* (2013.01); *G06Q 10/06316* (2013.01); *G06Q 10/06398* (2013.01)

(58) Field of Classification Search
CPC .............................. G06Q 10/00; G06Q 30/02
USPC ................................................ 705/7.11–7.42
See application file for complete search history.

(56) References Cited

PUBLICATIONS

Technical Disclosure, "Improved Method and System for Managing Workflow Tasks", IP.com, IPCOM000184057D, published Jun. 9, 2009.
Momotko et al., "Dynamic Changes in Workflow Participant Assignment," paper accepted to Sixth East-European Conference on Advanced in Databases and Information Systems, ADBIS 2002, Sep. 8-11, 2002, Bratislava, Slovakia.
IBM Patent Application ROC920100037US1 entitled "Customizing Workflow Based on Participant History and Participant Profile," filed by Todd E Johnson et al. on Jun. 3, 2010.

*Primary Examiner* — David Rines
(74) *Attorney, Agent, or Firm* — Martin & Associates, LLC; Derek P. Martin

(57) ABSTRACT

A workflow system allows defining criteria for an automated task agent to perform tasks for a participant automatically without input from the participant at the time the task is performed. Automated tasks are performed by an automated task agent according to the participant's history in performing similar tasks in the past. Tasks completed by automated task agents are displayed to a user in a manner that distinguishes automated tasks from manual tasks.

19 Claims, 12 Drawing Sheets

| Sample Participant Script Database ||
|---|---|
| User | Scripts |
| Joe | Comment on code consistency<br>Comment on API interaction<br>General comments |
| Jane | Comment on code consistency<br>JavaDoc reminder<br>General comments |
| Fred | Comment on icons and colors<br>General comments |

| Sample Participant-Specific Task Automation Policies |||
|---|---|---|
| User | Criteria | Scripts to Run when Criteria Satisfied |
| Joe | Document Type = "Design Specification"<br>Joe reviewed Design Specification documents > 10 times<br>Document contains "User Interface" section<br>Document State = First Review | Comment on code consistency<br>Comment on API interaction<br>General comments |
| Jane | Document Type = "Design Specification"<br>Jane reviewed Design Specification documents > 10 times<br>Document contains "Database" section<br>Document State = First Review | Comment on code consistency<br>JavaDoc reminder<br>General comments |
| Fred | Document Type = "Design Specification"<br>Document contains "User Interface" section<br>Document State = First Review | Comment on icons and colors<br>General comments |

```
Document Properties:                                                    1500
•    Document Type: Design Specification
•    State: First Review Document Content:
<StartOfDocument>
<Title>
Design Specification for Best Enterprise Software Technology's Tree Widget
</Title>
<Section name "User Interface">
     This section explains BEST's new and improved tree widget.

The widget is implemented using the following classes:
     com.best.version3widgets.tree.Tree
     com.best.version3widgets.tree.Folder
     com.best.version3widgets.tree.Leaf Figure 3 shows a screen shot of the new widget:
     [screen shot goes here]
     Figure 3.

The widget interacts with the database by utilizing the following APIs:
     Database.categories.getRoot()
     Database.getChildren(Folder)
     Database.getAttributes(Leaf)
</Section>
<EndOfDocument>
```

FIG. 15

Document Properties:                    1600
- Document Type: Design Specification
- State: First Review Document Content:
<StartOfDocument>
<Title>
Design Specification for Best Enterprise Software Technology's Tree Widget
</Title>
<Section name "User Interface">
  This section explains [BEST]'s new and improved tree widget.

| Fred: Always spell out the company name in addition to using the acronym |
|---|
| Automated comment from: General comments script      1610 |

The widget is implemented using the following classes:
  com.best.[version3widgets].tree.Tree

| Joe: The "version3widgets" package was only meant to be temporary for prototyping purposes. Please remove it in the final specification. |
|---|
| Automated comment from: Code consistency script      1620 | com.best.version3widgets.tree.Folder
  com.best.version3widgets.tree.[Leaf]

| Joe: I really hate the term "Leaf." Can we use "Node" instead? |
|---|
| Automated comment from: General comments script      1630 |

Figure 3 shows a screen shot of the new widget:
  [screen shot goes here]

| Fred: Only icons from the corporate graphics repository can be used! |
|---|
| Automated comment from: Icons and colors script |
| Fred: The colors do not comply with the approved color palette. |
| Automated comment from: Icons and colors script      1640 |

Figure 3.

The widget interacts with the database by utilizing the following APIs:
  Database.categories.getRoot()
  Database.getChildren(Folder)
  Database.[getAttributes](Leaf)

| Joe: Consider changing this to "getProperties()" for consistency with other APIs |
|---|
| Automated comment from: API interaction script      1650 |

</Section>
<EndOfDocument>

FIG. 16

AUTOMATING WORKFLOW PARTICIPATION

BACKGROUND

1. Technical Field

This disclosure generally relates to workflow systems, and more specifically relates to automating workflow participation so a participant's input to the workflow may be automated.

2. Background Art

A content management system (CMS) allows many users to efficiently share electronic content such as text, audio files, video files, pictures, graphics, etc. Content management systems typically control access to content in a repository. A user may generate content, and when the content is checked into the repository, the content may be subsequently processed by the CMS according to predefined rules. A user may also check out content from the repository, or link to content in the repository while generating content. The rules in a CMS assure that content that comes into or out of the system or that is linked to meets desired criteria specified in the rules.

Many content management systems include a workflow system for managing workflow performed by participants that use the content management system. For example, a workflow could be defined by a workflow coordinator for a particular document that assigns different tasks for the document to many different participants. Each participant must perform their assigned task(s) for the workflow to be complete. However, many factors such as other pending deadlines may delay a participant's completion of the task. The delay by one participant can delay the entire workflow when the participant's input is required for the workflow to be complete.

BRIEF SUMMARY

A workflow system allows defining criteria for an automated task agent to perform tasks for a participant automatically without input from the participant at the time the task is performed. Automated tasks are performed by an automated task agent according to the participant's history in performing similar tasks in the past. Tasks completed by automated task agents are displayed to a user in a manner that distinguishes automated tasks from manual tasks.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 13 is a sample participant script database;

FIG. 14 shows samples of participant-specific task automation policies;

FIG. 15 shows a sample document; and

FIG. 16 shows the sample document in FIG. 15 after being annotated by automated task agents after automatically running scripts for two participants.

DETAILED DESCRIPTION

Many known content management systems use extensible markup language (XML) due to its flexibility and power in managing diverse and different types of content. One known content management system that uses XML is Solution for Compliance in a Regulated Environment (SCORE) developed by IBM Corporation. XML is growing in popularity, and is quickly becoming the preferred format for authoring and publishing. While XML documents are one possible example of content that may be managed by a content management system, the disclosure and claims herein expressly extend to content management systems that do not use XML.

Many content management systems, including SCORE, include a workflow system that allows a workflow coordinator to define a workflow and to assign tasks in the workflow to particular participants. The claims and disclosure herein provide a way for a workflow system to automate the input from a particular participant when certain criteria are met based on the participant's history in performing similar tasks. An automated task agent automatically performs a selected task for a selected participant when the criteria are met. Work performed by the automated agent may be annotated to distinguish the automated work from manual work performed by participants. The work may then be displayed in a manner that distinguishes between work by automated agents on behalf of participants and manual work by participants.

Figure 1:
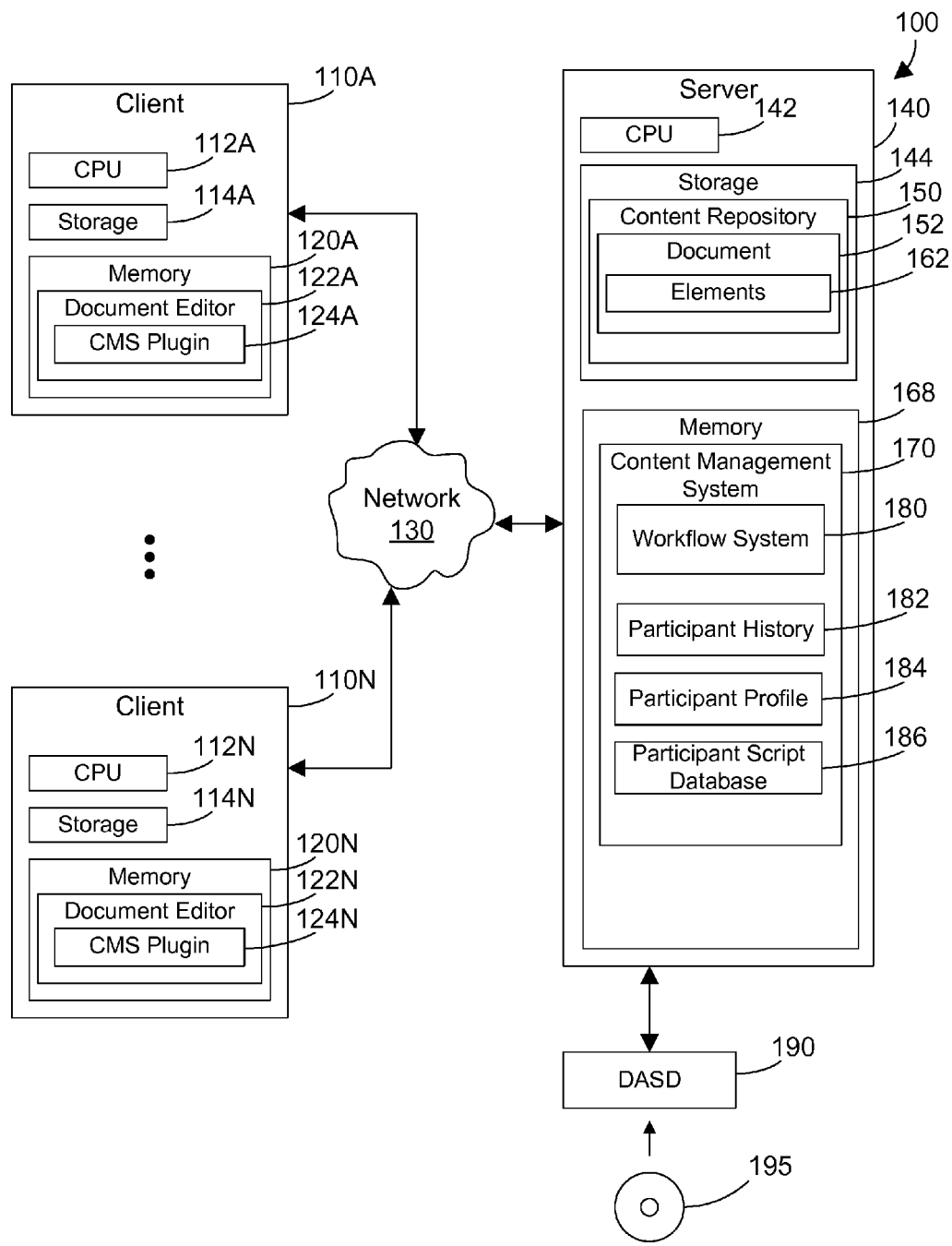
FIG. 1 is a block diagram of a networked computer system that includes a server computer system that has a content management system with a workflow system.

Referring to FIG. 1, networked computer system 100 includes multiple clients, shown in FIG. 1 as clients 110A, . . . , 110N, coupled to a network 130. Each client preferably includes a CPU, storage, and memory that contains a document editor, and a content management system (CMS) plugin. Thus, client 110A includes a CPU 112A, storage 114A, memory 120A, a document editor 122A in the memory 120A that is executed by the CPU 112A, and a CMS plugin 124A that allows the document editor 122A to interact with content 152 in the repository 150 that is managed by the CMS 170 in server 140. In similar fashion, other clients have similar components shown in client 110A, through client 110N, which includes a CPU 112N, storage 114N, memory 120N, a document editor 122N, and a CMS plugin 124N.

The CMS 170 resides in the main memory 168 of a server computer system 140 that also includes a CPU 142 and storage 144 that includes a content repository 150 that holds one or more documents 152 managed by the CMS 170. Document 152 may include one or more elements 162. The term "element" means any section or portion of a document that may be individually displayed or operated on, whether actually in the document or linked to the document.

One example of a suitable server computer system 140 is an IBM eServer System i computer system. However, those skilled in the art will appreciate that the disclosure herein applies equally to any type of client or server computer systems, regardless of whether each computer system is a complicated multi-user computing apparatus, a single user workstation, or an embedded control system. CMS 170 includes a workflow system 180, participant history 182, participant profile 184, and participant script database 186. The workflow system 180 allows a workflow coordinator to define a workflow that includes multiple tasks, including which participants will participate in the workflow, and due dates for the tasks in the workflow. Details of workflow system 180 are shown in more detail and discussed below with reference to the remaining figures.

The participant history 182 is generated by the workflow system 180, and includes any suitable information relating to the participant's performance in using the workflow system 180. For example, the participant history 182 could indicate information regarding how a participant completed in the past tasks assigned by the workflow system 180. Of course, participant history 182 could also include any other suitable information that could be collected by the workflow system 180 relating to a participant. The participant profile 184 is information entered by a participant that may be used by the workflow system 180. Participant profile 184 could include any information pertaining to a participant that the participant may want to make available for the workflow system that could help the workflow system to perform its tasks or determine whether a task assigned to the participant may be automated or not.

In FIG. 1, repository 150 is shown separate from content management system 170. In the alternative, repository 150 could be within the content management system 170. Regardless of the location of the repository 150, the content management system 170 controls access to content 152 in the repository 150.

Server computer system 140 may include other features of computer systems that are not shown in FIG. 1 but are well-known in the art. For example, server computer system 140 preferably includes a display interface, a network interface, and a mass storage interface to an external direct access storage device (DASD) 190. The display interface is used to directly connect one or more displays to server computer system 140. These displays, which may be non-intelligent (i.e., dumb) terminals or fully programmable workstations, are used to provide system administrators and users the ability to communicate with server computer system 140. Note, however, that while a display interface is provided to support communication with one or more displays, server computer system 140 does not necessarily require a display, because all needed interaction with users and other processes may occur via the network interface.

The network interface is used to connect the server computer system 140 to multiple other computer systems (e.g., 110A, . . . , 110N) via a network, such as network 130. The network interface and network 130 broadly represent any suitable way to interconnect electronic devices, regardless of whether the network 130 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The mass storage interface is used to connect mass storage devices, such as a direct access storage device 190, to server computer system 140. One specific type of direct access storage device 190 is a readable and writable CD-RW drive, which may store data to and read data from a CD-RW 195.

Main memory 168 preferably contains data and an operating system that are not shown in FIG. 1. A suitable operating system is a multitasking operating system known in the industry as i5/OS; however, those skilled in the art will appreciate that the spirit and scope of this disclosure is not limited to any one operating system. In addition, server computer system 140 utilizes well known virtual addressing mechanisms that allow the programs of server computer system 140 to behave as if they only have access to a large, single storage entity instead of access to multiple, smaller storage entities such as main memory 168, storage 144 and DASD device 190. Therefore, while data, the operating system, and content management system 170 may reside in main memory 168, those skilled in the art will recognize that these items are not necessarily all completely contained in main memory 168 at the same time. It should also be noted that the term "memory" is used herein generically to refer to the entire virtual memory of server computer system 140, and may include the virtual memory of other computer systems coupled to computer system 140.

CPU 142 may be constructed from one or more microprocessors and/or integrated circuits. CPU 142 executes program instructions stored in main memory 168. Main memory 168 stores programs and data that CPU 142 may access. When computer system 140 starts up, CPU 142 initially executes the program instructions that make up the operating system.

Although server computer system 140 is shown to contain only a single CPU, those skilled in the art will appreciate that a content management system 170 may be practiced using a computer system that has multiple CPUs. In addition, the interfaces that are included in server computer system 140 (e.g., display interface, network interface, and DASD interface) preferably each include separate, fully programmed microprocessors that are used to off-load compute-intensive processing from CPU 142. However, those skilled in the art will appreciate that these functions may be performed using I/O adapters as well.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
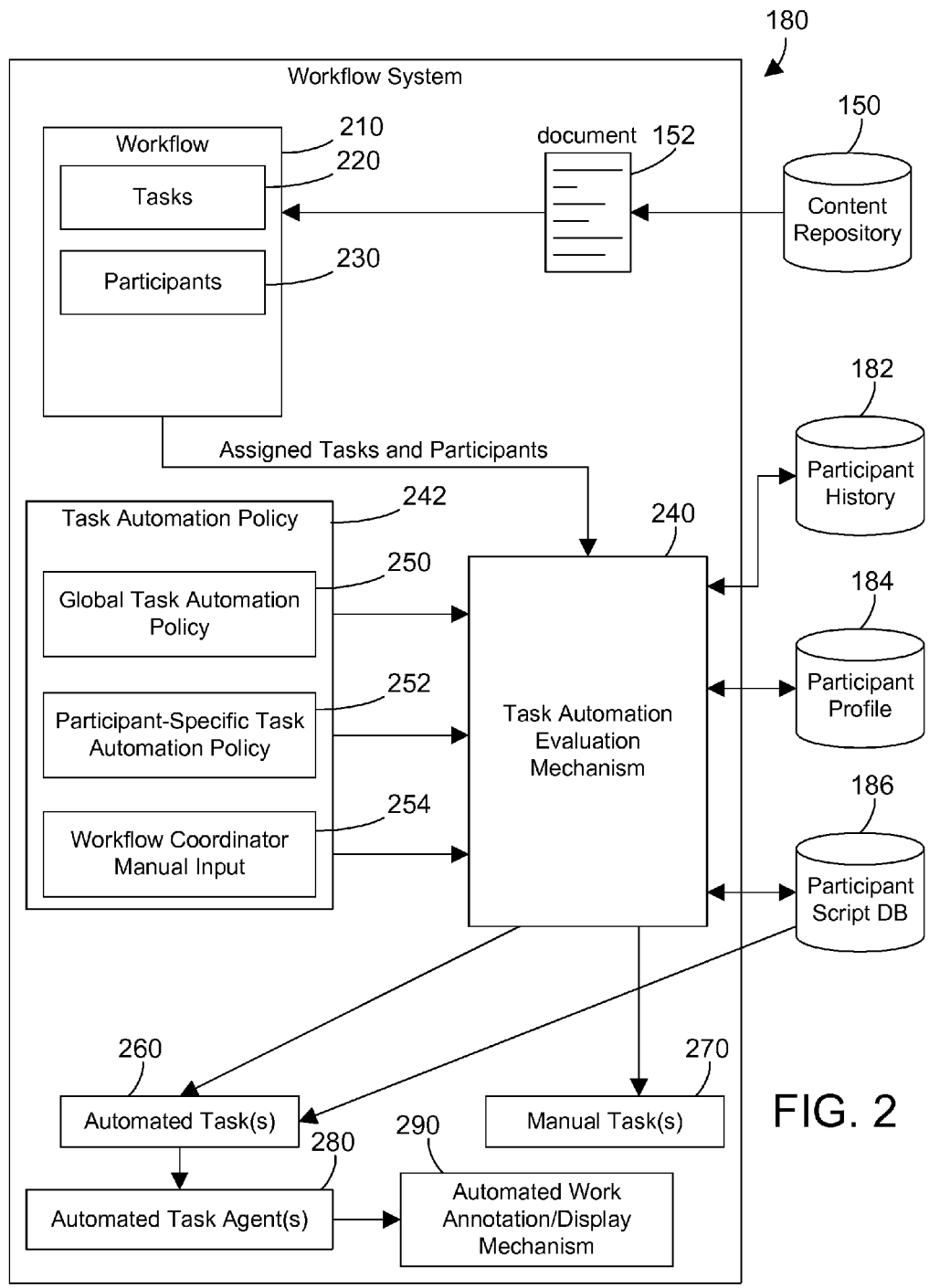
FIG. 2 is a block diagram showing aspects of the workflow system shown in FIG. 1.

FIG. 2 shows additional details of the workflow system 180 shown in FIG. 1. The workflow system 180 allows a workflow coordinator to define a workflow 210 that includes multiple tasks 220 that may be assigned to multiple participants 230. In the context of the content management system 170 shown in FIG. 1, a workflow is defined to process a document 152 in the content repository 150.

Figure 3:
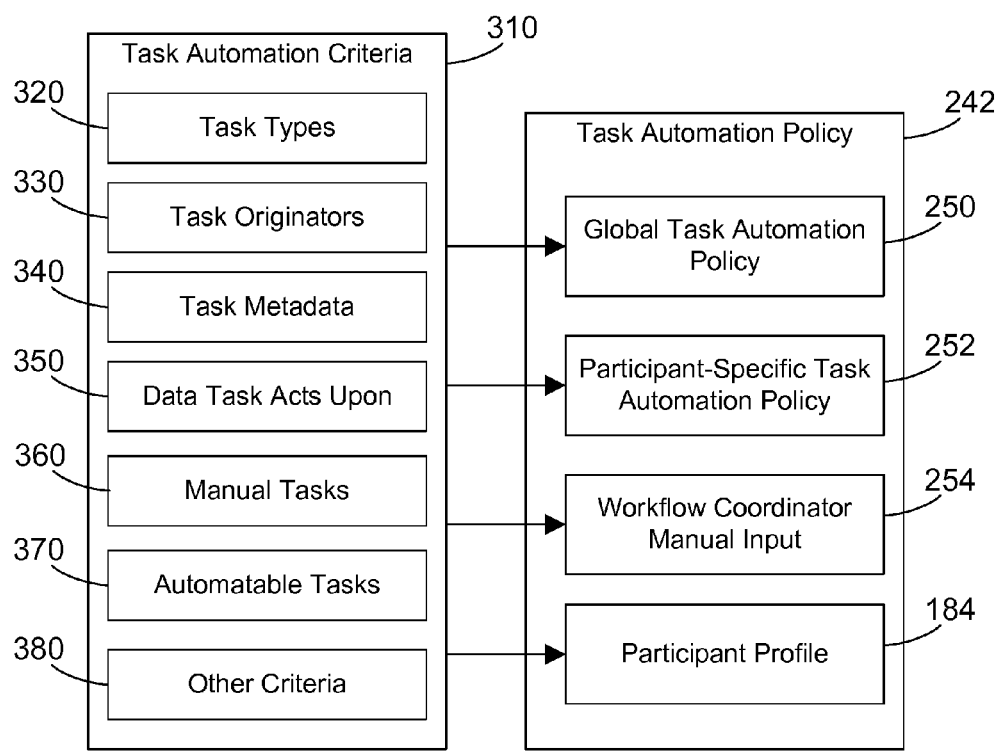
FIG. 3 is a block diagram showing various task automation criteria that may be included to determine whether the performance of a task is allowed to be automated.

A task automation evaluation mechanism 240 reviews assigned tasks and participants from the workflow 210, and determines whether any of the assigned tasks may be automated for the assigned participants. Many different sources of information may be used by the task automation evaluation mechanism 240 in determining whether a task may be automated or not. For example, a task automation policy 242 may be defined that specifies criteria for determining whether tasks may be automated or not. The task automation policy may include several sources of information, including a global task automation policy 250, a participant-specific task automation policy 252, and manual input by the workflow coordinator 254. Items 250, 252 and 254 are shown in FIGS. 2 and 3 by way of example of certain information that may be included in a task automation policy 242. Of course, other suitable information could also be included in the task automation policy 242, and some of the information shown in FIGS. 2 and 3 could be omitted as required by the needs of a particular application.

The task automation evaluation mechanism 240 may also use information from participant history 182, participant profile 184, and participant script database 186 to determine whether a selected task by a selected participant may be automated or not. The task automation evaluation mechanism 240 receives the assigned tasks and participants from the workflow 210, and outputs automated tasks 260 and manual tasks 270. Manual tasks 270 are preferably processed by notifying the assigned participant of the task, and awaiting manual input from the assigned participant to complete the task. Automated tasks 260 preferably comprise one or more scripts from the participant script database 186 that are executed automatically without input from the selected participant at the time the task is executed. The scripts in the automated tasks 260 are preferably executed by one or more automated task agents 280. Work performed by an automated task agent 280 is preferably annotated so the automated work may be distinguished from manual work of participants. The automated work annotation/display mechanism 290 performs the annotation of automated work, and displays the automated work differently from the display of manual work by participants. This allows a person reviewing a workflow to visually identify which work was manually performed by a participant and which work was automatically performed by an automated task agent 280. The annotation and display of automated work differently from manual work may be done in any suitable manner, including text markers, different font or font size, different colors, bold, italics, underline, icons, boxes, etc. The disclosure and claims herein expressly extend to any suitable way to annotate and display automated work differently from manual work, whether currently known or developed in the future.

FIG. 3 illustrates that task administration policy 242 may include any suitable criteria for determining whether a selected task by a selected participant may be automated or not. Suitable task automation criteria 310 include: task types 320, task originators 330, task metadata 340, data a task acts upon 350, manual tasks 360, automatable tasks 370, and other suitable criteria 380. Task types 320 may include a list of task types that may be automated, which means tasks types that are not listed in task types 320 cannot be automated. Task originators 330 may include a list of originators of tasks that may be automated, which means tasks originated from task originators not listed in task originators 330 cannot be automated. Task metadata 340 may include any suitable metadata relating to the task. For the specific example of a document in a content management system, the task metadata 340 might include a list of document types that may be processed automatically, which means document types not in the task metadata 340 would not be processed automatically. Data a task acts upon 350 can specify any suitable data or attributes of data. Thus, if data is in the list of data task acts upon 350, the task may be automated, but if not, the task cannot be automated. Manual tasks 360 specifies tasks that may not be automated, and may include a list of manual tasks and/or any suitable criteria for defining tasks that may not be automated. For example, manual tasks may include wildcards that allow specifying a part of the task name or type followed by the wildcard. Any suitable list or criteria could be specified to define manual tasks 360. In similar manner, automatable tasks 370 may list or define criteria for automatable tasks. Other criteria 380 includes any criteria not listed or discussed above that could be used for determining whether a task may be automated or not.

Note that any or all or any combination of the task automation criteria 310 shown in FIG. 3 could be specified in the task automation policy 242, which means any or all or any combination of the task automation criteria 310 may be specified in each of the global task automation policy 250, the participant-specific task automation policy 252, the workflow coordinator manual input 254, and the participant profile 184. Task automation policy 242 may further include rules or logic for resolving any potential conflicts between criteria specified in the task automation policy 242. One suitable way to resolve conflicts is to specify a task as a manual task if any criteria indicates the task may not be automated, even if other criteria indicates the task may be automated.

Figure 4:
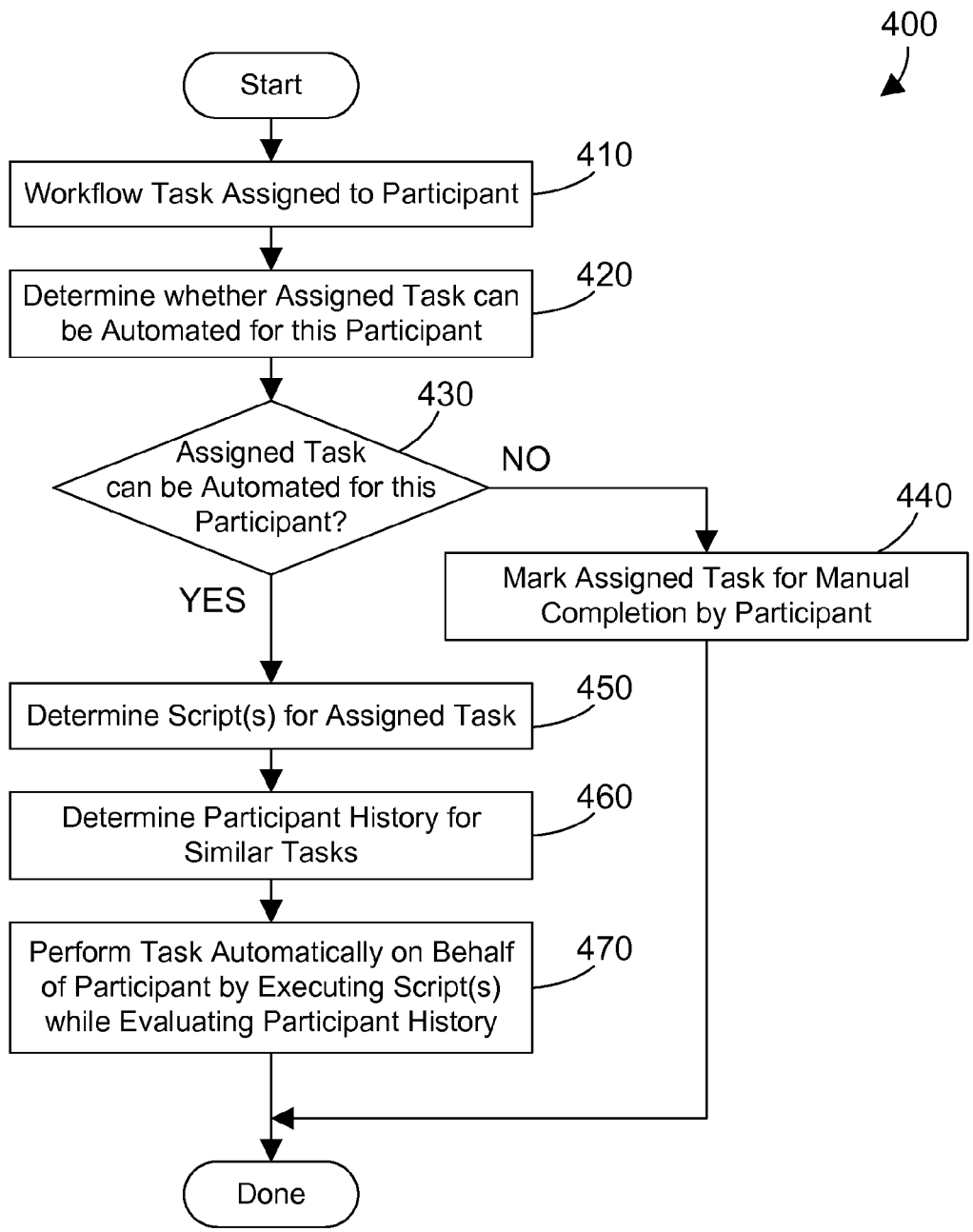
FIG. 4 is a flow diagram of a method for the workflow system in FIGS. 1 and 2.

Referring to FIG. 4, a method 400 is preferably performed by the workflow system 180 in FIG. 2. A workflow task is assigned to a participant (step 410). This is normally done by a workflow coordinator that defines the workflow. Next, determine whether the assigned tasks can be automated for this participant (step 420). If the assigned task cannot be automated for this participant (step 430=NO), the task is marked for manual completion by the participant (step 440), which means the task becomes one of the manual tasks 270 shown in FIG. 2. If the assigned tasks can be automated for this participant (step 430=YES), the script or scripts corresponding to the assigned task are determined (step 450), and the participant history for similar tasks is determined (step 460). What constitutes a similar task may vary as needed. For example, in a workflow system 180 in a content management system 170, a "similar task" could be defined to be a same type of task on a same type of element in a document. In the alternative, a "similar task" could be defined to be the same exact task on a same type of element in a document. In another example, a "similar task" could be defined to be a task within a list of defined similar tasks. The disclosure and claims herein extend to any suitable criteria to define similar tasks, and for using participant history for similar tasks. In addition, the amount of participant history considered in step 460 may be filtered according to some suitable criteria. For example, only history for the past year or only history for the last product release cycle could be used. The workflow system 180 may consider any or all of the participant history 182 in performing automated tasks on behalf of a participant. The task is then performed automatically on behalf of the participant by executing the corresponding script(s) while evaluating the participant history (step 470). Method 400 is then done.

Figure 5:
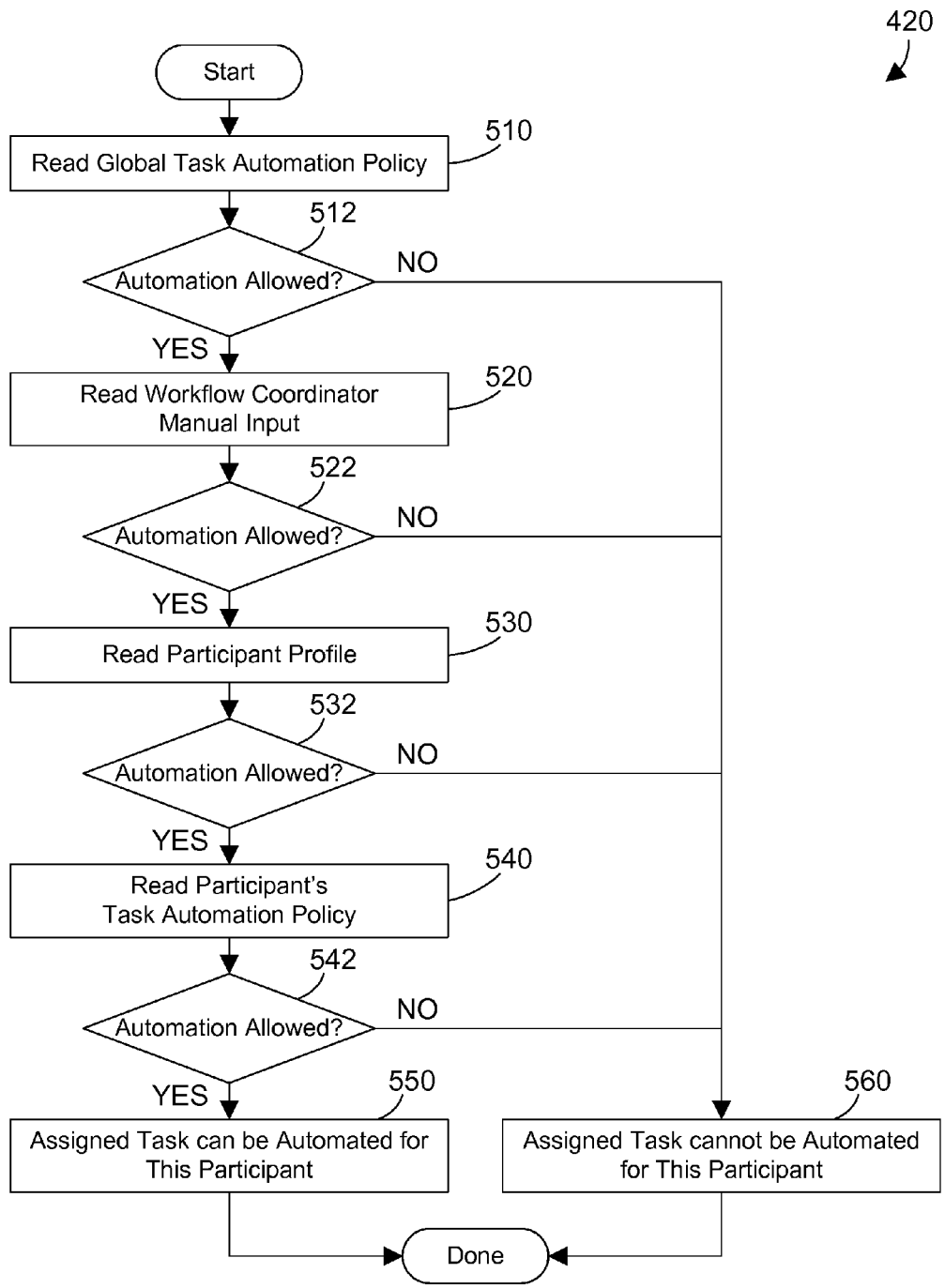
FIG. 5 is a flow diagram of one specific method for determining whether an assigned task may be automated for a particular participant.

One suitable implementation for step 420 in FIG. 4 is shown as method 420 in FIG. 5. The specific example in FIG. 4 assumes each of the global task automation policy 250, participant-specific task automation policy 252, workflow coordinator manual input 254, and participant profile 184 in FIG. 2 each include criteria that is used to determine whether a task may be automated or not. The global task automation policy 510 is read (step 510). If automation of the assigned task for this participant is not allowed (step 512=NO), the assigned task cannot be automated for this participant (step 560). If the global task automation policy 510 indicates automation is allowed for the assigned task for this participant (step 512=YES), the workflow coordinator manual input is read (step 520). If the workflow coordinator manual input indicates automation of the assigned task for this participant is not allowed (step 522=NO), the assigned task cannot be automated for this participant (step 560). If the workflow coordinator manual input indicates automation is allowed for the assigned task for this participant (step 522=YES), the participant profile is read (step 530). If the participant profile indicates automation of the assigned task for this participant is not allowed (step 532=NO), the assigned task cannot be automated for this participant (step 560). If the participant profile indicates automation is allowed for the assigned task for this participant (step 532=YES), the participant's task automation policy is read (step 540). If the participant's task automation policy indicates automation of the assigned task for this participant is not allowed (step 542=NO), the assigned task cannot be automated for this participant (step 560). If the participant's task automation policy indicates automation is allowed for the assigned task for this participant (step 542=YES), the assigned task can be automated for this participant (step 550). Method 420 is then done.

Figure 6:
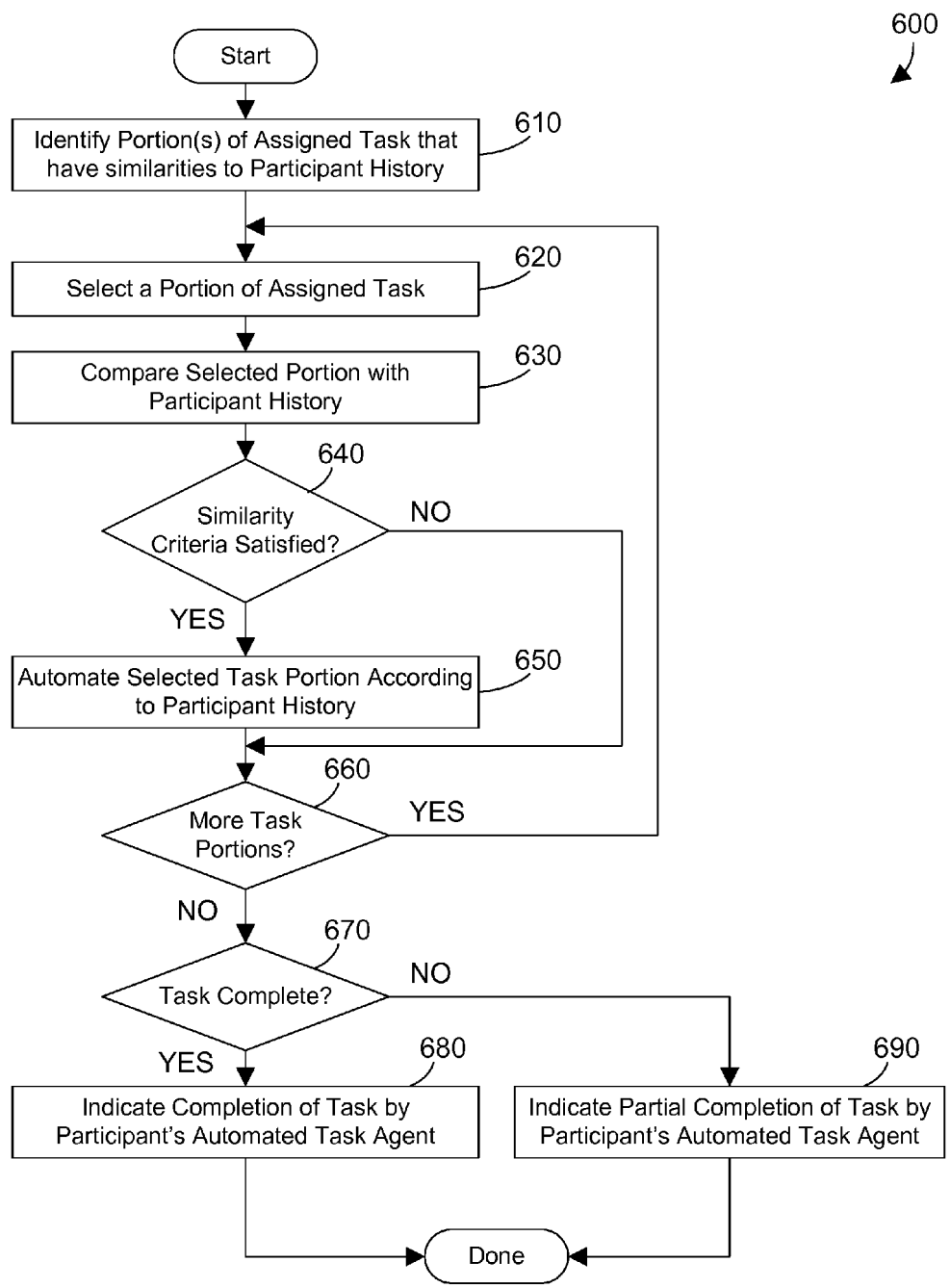
FIG. 6 is a flow diagram of a method for automated performance of a task.

Referring to FIG. 6, a method 600 shows how an automated task agent 280 may perform an automated task 260 (FIG. 2). First, the portions of the assigned task that have similarities to the participant history are identified (step 610). A portion of the assigned task is selected (step 620). The selected portion is compared with the participant history (step 630). If a similarity criteria is satisfied (step 640=YES), the selected task is automated according to the participant history (step 650). If the similarity criteria is not satisfied (step 640=NO), step 650 is skipped. If there are more task portions to process (step 660=YES), method 600 loops back to step 620 and continues until there are no more task portions to process (step 660=NO). If the task is complete (step 670=YES), which means all portions of the task were successfully automated, the completion of the task by the participant's automated task agent is indicated (step 680). If the task is not complete (step 670=NO), partial completion of the task by the participant's automated task agent is indicated (step 690). Method 600 is then done. We see from the flow diagram 600 in FIG. 6 that even if the automated task agent is not successful in completing the task, it still provides a significant benefit by indicating partial completion of the task, which may reduce the amount of manual work the participant must do to complete the task.

Figure 7:
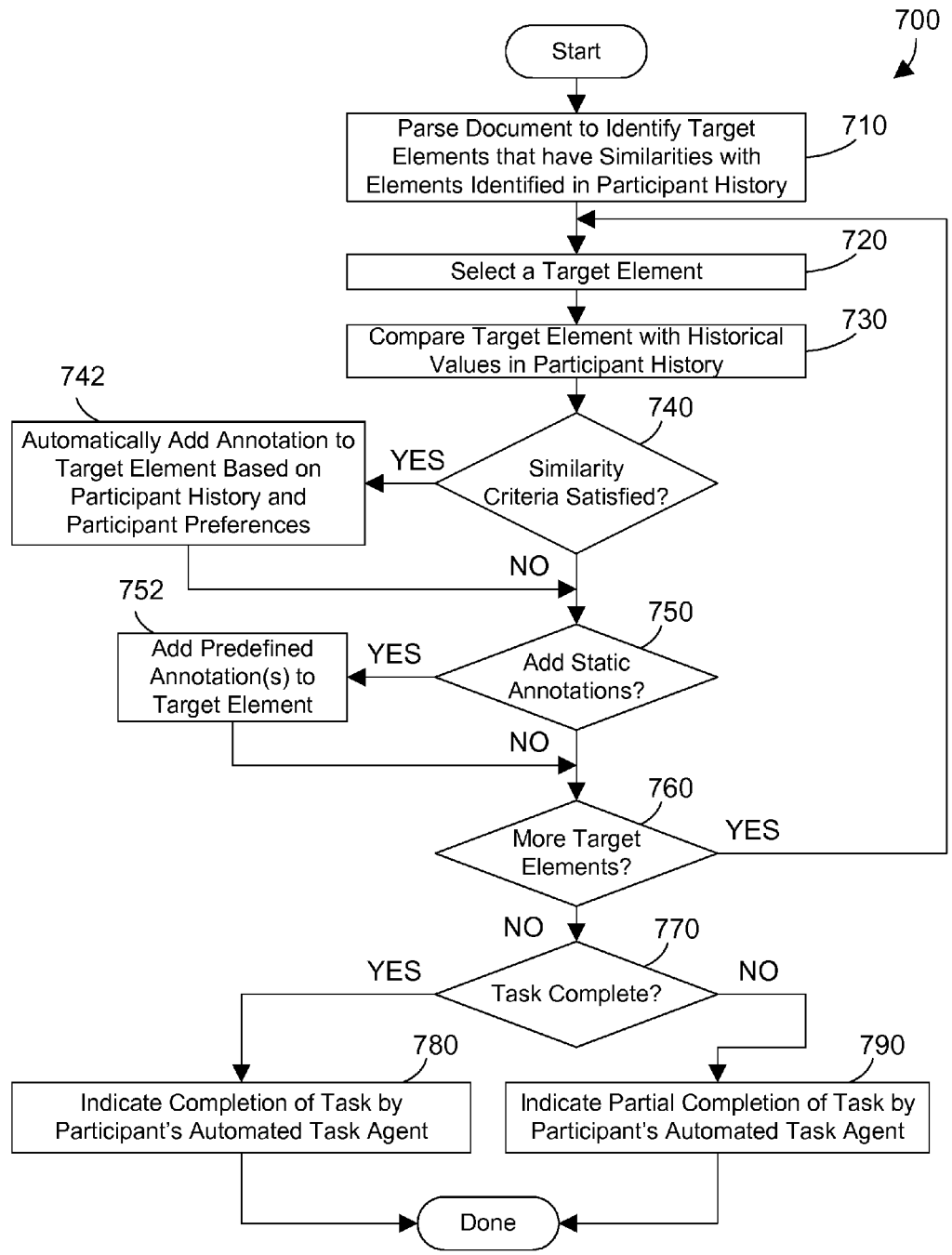
FIG. 7 is a flow diagram of a method for automated performance of a task in reviewing a document in the content management system shown in FIG. 1.

Referring to FIG. 7, a method 700 is one suitable example of a method similar to method 600 in FIG. 6 in the specific context of a workflow system 180 in a content management system 170 as shown in FIG. 1. We assume a workflow is defined to review an instance of a document. Method 700 begins by parsing the document to identify target elements that have similarities with elements identified in the participant history (step 710). A target element is selected (step 720). The target element is compared with historical values in the participant history (step 730). If the similarity criteria is satisfied (step 740=YES), automatically add an annotation to the target element based on the participant history and participant preferences (step 742). If the similarity criteria is not satisfied (step 740=NO), no annotations are added to the target element. If static annotations need to be added (step 750=YES), the predefined static annotations are added to the target element (step 752). If not (step 750=NO), no static annotations are added. If there are more target elements to process (step 760=YES), method 700 loops back to step 720 and continues until there are no more target elements to process (step 760=NO). If the task is complete (step 770=YES), the completion of the task by the participant's automated task agent is indicated (step 780). If the task is not complete (step 770=NO), the partial completion of the task by the participant's automated task agent is indicated (step 790). Method 700 is then done.

Figure 8:
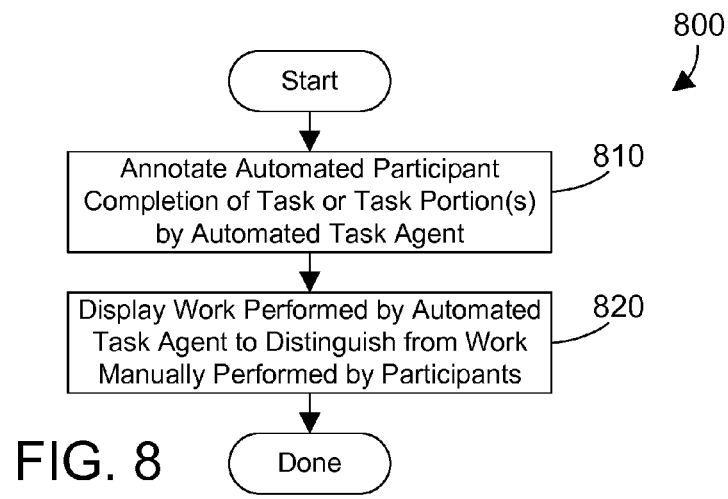
FIG. 8 is a flow diagram of a method for annotating and displaying automated participation in a task.

Method 800 in FIG. 8 shows steps preferably performed by the automated work annotation/display mechanism 290 in FIG. 2. The task portions completed by an automated task agent are annotated (step 810). The annotations in step 810 allow the work performed by the automated task agents to be displayed in a way that distinguishes work performed by the automated task agents from work manually performed by participants (step 820). Allowing a person reviewing a workflow to visually distinguish between tasks performed by automated task agents and tasks performed manually by participants helps the person to see who did what in the workflow.

Figure 9:
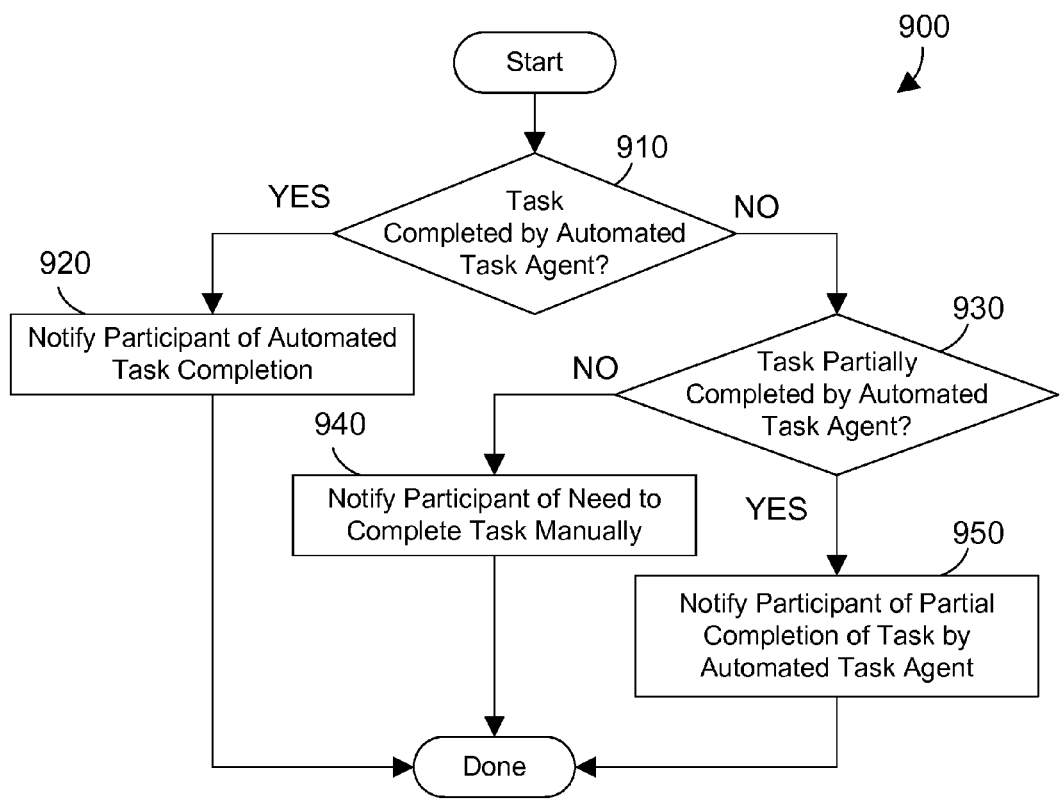
FIG. 9 is a flow diagram of a method for notifying a participant regarding the activity of the participant's automated task agent.

Referring to FIG. 9, a method 900 begins by determining whether a task was completed by an automated task agent (step 910). If so (step 910=YES), the participant is notified of the task completion by the automated task agent (step 920). If the task was not completed by the automated task agent (step 910=NO), method 900 checks to see if the task was partially completed by the automated task agent (step 930). If so (step 930=NO), the participant is notified of the need to complete the task manually (step 940). If the task is partially completed by the automated task agent (step 930=YES), the participant is notified of the partial completion of the task by the automated task agent (step 950). The participant may then review what the automated task agent did in partially completing the task, and may manually complete the task. Method 900 is then done.

Figures 10, 11, 12:
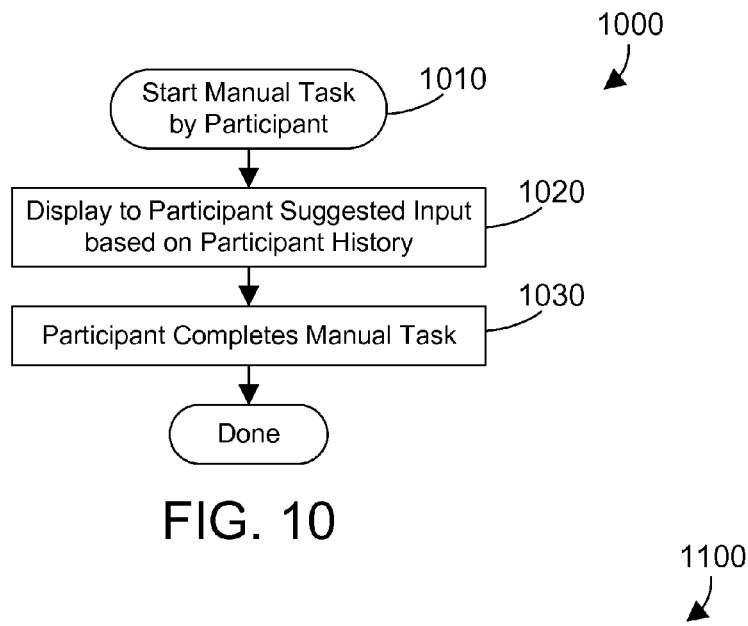
FIG. 10 is a flow diagram of a method for an automated task agent to suggest input to a participant when the participant manually performs a task.
FIG. 11 is a sample global task automation policy.
FIG. 12 is a sample participant history.

FIG. 10 shows a method 1000 for a participant to perform a manual task. Method 1000 begins when a participant starts a manual task (step 1010). Even when the criteria in the task automation policy 242 is not satisfied, which means the task may not be automated, the task automation evaluation mechanism 240 in FIG. 2 can still provide valuable input to the participant that may help the participant complete a manual task. Thus, without regard to whether the criteria in the task automation policy 242 is satisfied, the workflow system 180 may still review the participant history 182 and display suggested input to the user based on the participant history (step 1020). The participant may then manually complete the task (step 1030), and method 1000 is done. Thus, even for manual tasks, the workflow system can help the participant by displaying suggested input based on the participant's history in performing similar tasks.

A specific example is now given to illustrate many of the general concepts disclosed above. For this example, we assume participants are assigned tasks relating to the review of a document in a content management system. Note the term "user" is often used in this example to refer to a participant in a workflow. A sample global task automation policy 1100 is shown in FIG. 11, which specifies that automation of tasks is allowed only for tasks for documents that have a document state of "First Review" or "Second Review." This global task automation policy would prevent any automation of tasks during a third and subsequent review.

Sample participant history 1200 is shown in FIG. 12. A user Joe is a User Interface expert, and his work history indicates he has reviewed 50 design specifications. A user Jane is a database expert, and her work history indicates she has reviewed 30 design specifications. A user Fred is a marketing expert, and his work history shows he has not reviewed any design specifications. Note the specifics of the work history for each user, such as comments made in reviewing past documents, are included in participant history 182, but are not shown in FIG. 12.

FIG. 13 shows a sample participant script database 1300, which is one suitable example of the participant script database 186 shown in FIG. 2. The user Joe has three scripts defined, namely: Comment on code consistency, Comment on API interaction, and General comments. The user Jane has three scripts defined, namely: Comment on code consistency, JavaDoc reminder, and General Comments. The user Fred has two scripts defined, namely: Comment on icons and colors, and General comments.

FIG. 14 shows sample participant-specific task automation policies 1400 for the three participants Joe, Jane and Fred. Note the participant-specific task automation policies 1400 are examples of the participant-specific task automation policy 252 shown in FIGS. 2 and 3. For the user Joe, the criteria for automating a task states if the document type is "Design Specification", and if Joe has reviewed more than 10 design specifications, and if the document contains a "User Interface" section, and if the Document State is First Review, then Joe's participation in reviewing the document may be automated. When the criteria for Joe is met, the three scripts Comment on code consistency, Comment on API interaction, and General comments are run. For the user Jane, the criteria for automating a task states if the document type is "Design Specification", and if Jane has reviewed more than 10 design specifications, and if the document contains a "Database" section, and if the Document State is First Review, then Jane's participation in reviewing the document may be automated. When the criteria for Jane is met, the three scripts Comment on code consistency, JavaDoc reminder, and General comments are run. For the user Fred, the criteria for automating a task states if the document type is "Design Specification", and if the document contains a "User Interface" section, and if the Document State is First Review, then Fred's participation in reviewing the document may be automated. When the criteria for Fred is met, the two scripts Comment on icons and colors and General comments are run.

FIG. 15 shows a sample document 1500 that is operated on by a workflow. We assume the users Joe, Jane and Fred all have assigned tasks in the workflow for reviewing document 1500. Document 1500 has a document type of "Design Specification", and a state of "First Review." We now evaluate the criteria in the participant-specific task automation policies 1400 shown in FIG. 14. For user Joe, the document type is "Design Specification", the work history for Joe (FIG. 12) shows Joe has reviewed more than 10 design specifications, the document contains a "User Interface" section, and the document state is First Review. Because all of the criteria for Joe are met, the three listed scripts for Joe may be run by the automated task agent to automate Joe's performance of the assigned task. For user Jane, the document type is "Design Specification", and the work history for Jane (FIG. 12) shows Jane has reviewed more than 10 design specifications. However, the document 1500 does not include a "Database" section. For this reason, Jane's task relating to document 1500 cannot be automated because the criteria in FIG. 14 for Jane are not all met. As a result, the scripts for Jane are not run by an automated task agent, and the task must be performed manually by Jane. For user Fred, the document type is "Design Specification", the document contains a "User Interface" section, and the document state is First Review. As a result, the criteria for Fred in FIG. 14 are all satisfied, which means the two scripts for Fred may be executed by the automated task agent to automate Fred's performance of the assigned task.

FIG. 16 shows document 1600, which is document 1500 in FIG. 15 after being annotated according to the comments that resulted from the automated task agents running the scripts for Joe and Fred. The annotations in this specific example are graphic boxes with text that provide both the comment generated by the automated task agent based on the participant's past history in reviewing similar documents, along with an indication that the comment was automated. We assume for this example that Joe's work history includes comments 1620, 1630 and 1650 for other similar documents that Joe manually performed in the past. When the automated task agent sees items in the work history that correspond to items in the current document, the automated task agent may automatically generate those same comments for document 1500, which are displayed in document 1600. We likewise assume for this example that Fred's work history includes comments 1610 and 1640 for other similar documents that Fred manually performed in the past. Because Fred's work history in FIG. 12 shows Fred has not reviewed design specifications in the past, the comments 1610 and 1640 were made by Fred in reviewing other documents that are deemed to be similar to a design specification according to some similarity criteria.

Comment 1610 in FIG. 16 is a comment regarding the acronym BEST from Fred that was automatically generated by the automated task agent executing Fred's General comments script. Comment 1620 is a comment regarding version3widgets that was automatically generated by the automated task agent executing Joe's Code consistency script. Comment 1630 is a comment regarding the word "Leaf" that was automatically generated by the automated task agent executing Joe's General comments script. Comment 1640 includes two comments from Fred regarding the screen shot graphic that were automatically generated by the automated task agent executing Fred's Icons and colors script. Comment 1650 is a comment regarding getAttributes that was automatically generated by the automated task agent executing Joe's API interaction script. Note that the automatically-generated comments are displayed, along with the participant responsible for those comments (i.e., the participant on behalf of whom the automated task agent generated the comments based on the participant's history), and an indication the comments were automated comments. The display of document 1600 will thus allow a person reviewing the document 1600 to readily see which comments were generated automatically and which comments were added manually by participants.

The workflow system described herein and claimed allows a task assigned to a participant to be automated when specified criteria are met. The automation of a task is based on the participant's work history in performing similar work. The automated completion of tasks and task portions is annotated so that tasks and task portions that were automated are visually distinguishable from tasks and task portions that are manually completed by participants.

The specific examples shown in the figures and discussed above are in the context of a workflow system in a content management system. However, the disclosure and claims herein expressly extend to any workflow system, whether integrated as part of a different system or implemented as a stand-alone workflow system.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor, and the workflow system residing in the memory and executed by the at least one processor, the workflow system operating on a workflow that comprises a plurality of tasks assigned to a plurality of participants, the workflow system automatically executing functions comprising:
   reading a history for a selected participant comprising past performance for the selected participant as monitored by the workflow system, wherein the history includes one or more scripts representative of one or more functions performed by the selected participant during a past performance of a selected task, as monitored by the workflow system;
   reading a task automation policy that defines criteria for automated completion of the selected task by the selected participant, the workflow system determining when the criteria for automated completion of the selected task is satisfied, and automatically performing the selected task on behalf of the selected participant without input from the selected participant at the time the selected task is automatically performed based on the history for the selected participant when the criteria for automated completion of the selected task is satisfied, wherein the automatically performing the selected task includes, at least in part, the workflow system automatically executing the one or more scripts.

2. The apparatus of claim 1 wherein the history for the selected participant indicates input for tasks previously performed by the selected participant using the workflow system, and the automated completion of the selected task comprises input by the selected participant indicated in the history for at least one similar task.

3. The apparatus of claim 1 wherein the task automation policy specifies task types, task originators, task metadata, and data a task acts upon.

4. The apparatus of claim 1 wherein the task automation policy specifies tasks that must be performed manually.

5. The apparatus of claim 1 wherein the task automation policy specifies tasks that may be automated.

6. The apparatus of claim 1 wherein the workflow system annotates automated participant completion of tasks and task portions by an automated task agent and displays comments by the automated task agent differently from comments manually generated by participants.

7. A computer-implemented method for a workflow system to process a workflow that comprises a plurality of tasks assigned to a plurality of participants, the method comprising the steps of:
   providing at least one processor;
   providing a memory coupled to the at least one processor;
   the at least one processor performing the steps of:
   reading a history for a selected participant comprising past performance for the selected participant as monitored by the workflow system, wherein the history includes one or more scripts representative of one or more functions performed by the selected participant during a performance of a selected task, as monitored by the workflow system;
   reading a task automation policy that defines criteria for automated completion of a selected task by the selected participant;
   determining when the criteria for automated completion of the selected task is satisfied; and
   automatically performing the selected task on behalf of the selected participant without input from the selected participant at the time the selected task is automatically performed based on the history for the selected participant when the criteria for automated completion of the selected task is satisfied, wherein the automatically performing the selected task includes, at least in part, automatically executing the one or more scripts.

8. The method of claim 7 wherein the history for the selected participant indicates input for tasks previously performed by the selected participant using the workflow system, and the automated completion of the selected task comprises input by the selected participant indicated in the history for at least one similar task.

9. The method of claim 7 wherein the task automation policy specifies task types, task originators, task metadata, and data a task acts upon.

10. The method of claim 7 wherein the task automation policy specifies tasks that must be performed manually.

11. The method of claim 7 wherein the task automation policy specifies tasks that may be automated.

12. The method of claim 7 further comprising the steps of:
   annotating automated participant completion of tasks and task portions by an automated task agent; and
   displaying comments by the automated task agent differently from comments manually generated by participants.

13. A computer-implemented method for a workflow system to process a workflow that comprises a plurality of tasks assigned to a plurality of participants, the method comprising the steps of:
   providing at least one processor;
   providing a memory coupled to the at least one processor;
   the at least one processor performing the steps of:
   reading a history for a selected participant comprising input by a selected participant in performing a first task as monitored by the workflow system;
   reading a task automation policy that defines criteria for automated completion of a second task by the selected participant, wherein the task automation policy specifies task types, task originators, task metadata, data a task acts upon, tasks that must be performed manually, tasks that may be automated, and which of a plurality of scripts corresponding to the selected participant are executed when the criteria in the task automation policy is satisfied;
   determining when the criteria for automated completion of the second task is satisfied;
   automatically performing the second task on behalf of the selected participant without input from the selected participant at the time the second task is automatically performed based on the history for the selected participant in performing the first task when the criteria for automated completion of the second task is satisfied;
   annotating automated participant completion of the second task; and
   displaying automated participant completion of the second task differently from comments manually generated by other participants.

14. An article of manufacture comprising software stored on a non-transitory computer-readable storage medium, the software comprising:
   a workflow system that operates on a workflow that comprises a plurality of tasks assigned to a plurality of participants, the workflow system reading a history for a selected participant comprising past performance for the selected participant as monitored by the workflow system, wherein the history includes one or more scripts representative of one or more functions performed by the selected participant during a past performance of a selected task, as monitored by the workflow system, and reading a task automation policy that defines criteria for automated completion of a selected task by the selected participant, the workflow system determining when the criteria for automated completion of the selected task is satisfied, and automatically performing the selected task on behalf of the selected participant without input from the selected participant at the time the selected task is automatically performed based on the history for the selected participant when the criteria for automated completion of the selected task is satisfied, wherein the automatically performing the selected task includes, at least in part, the workflow system automatically executing the one or more scripts.

15. The article of manufacture of claim 14 wherein the history for the selected participant indicates input for tasks previously performed by the selected participant using the workflow system, and the automated completion of the selected task comprises input by the selected participant indicated in the history for at least one similar task.

16. The article of manufacture of claim 14 wherein the task automation policy specifies task types, task originators, task metadata, and data a task acts upon.

17. The article of manufacture of claim 14 wherein the task automation policy specifies tasks that must be performed manually.

18. The article of manufacture of claim 14 wherein the task automation policy specifies tasks that may be automated.

19. The article of manufacture of claim 14 wherein the workflow system annotates automated participant completion of tasks and task portions by an automated task agent and displays comments by the automated task agent differently from comments manually generated by participants.

* * * * *